United States Patent [19]

Rosaen

[11] Patent Number: 4,497,336

[45] Date of Patent: Feb. 5, 1985

[54] VALVE ASSEMBLY

[76] Inventor: Borje O. Rosaen, 4031 Thornoaks Dr., Ann Arbor, Mich. 48104

[21] Appl. No.: 487,858

[22] Filed: Apr. 22, 1983

[51] Int. Cl.³ .................... B08B 9/04; F16K 31/524
[52] U.S. Cl. .................... 137/244; 15/104.16;
137/625.38; 137/625.5; 251/95; 251/251;
222/148
[58] Field of Search ............. 137/244, 625.37, 625.38,
137/625.48, 625.49, 625.5, 625.68, 872;
15/104.16; 251/251, 95; 222/148

[56] References Cited

U.S. PATENT DOCUMENTS

| | | | |
|---|---|---|---|
| 2,066,112 | 12/1936 | Humblet | 251/251 |
| 2,130,614 | 9/1938 | Collins et al. | 137/244 |
| 2,662,721 | 12/1953 | Giauque | 137/625.5 |
| 3,572,384 | 3/1971 | Taylor | 137/625.5 |
| 3,658,083 | 4/1972 | Fetterolf et al. | 137/244 |
| 3,951,170 | 4/1976 | Hill | 137/625.48 |

FOREIGN PATENT DOCUMENTS 592607 9/1947 United Kingdom ............. 137/625.5

Primary Examiner—George L. Walton
Attorney, Agent, or Firm—Gifford, VanOphem, Sheridan, Sprinkle & Nabozny

[57] ABSTRACT

A valve assembly is disclosed which comprises a housing having at least two fluid ports which are adapted for connection to a fluid system. A piston is slidably mounted in the housing and movable between a first position in which the fluid ports are fluidly connected and a second position in which the fluid ports are fluidly disconnected. A seal is carried by the piston and engages a sealing surface in the housing when the piston is in its second position. A scraping member is also carried by the member so that the scraping member passes across and engages the sealing surface as the piston is moved from its first and to its second position thereby cleaning the seal surface. Preferably an eccentric cam is employed for moving the piston between its first and second positions.

9 Claims, 3 Drawing Figures 4,497,336

1

VALVE ASSEMBLY

BACKGROUND OF THE INVENTION

1. Field of the Invention

The present invention relates generally to valve assemblies and, more particularly, to a valve assembly with means for cleaning a sealing surface.

II. Description of the Prior Art

There are a number of previously known valve assemblies and many of these valve assemblies include a valve housing with three ports. A valve member is movably mounted within the valve housing between a first and second position. In its first position, the valve member fluidly connects the first and second ports to each other and fluidly disconnects the third port from the other two ports. Conversely, with the valve member in its second position, the first and third port are fluidly connected to each other while the second port is fluidly disconnected from the other two.

Many of these previously known valve assemblies are employed for selectively switching fluid flow between different filters in order to enable the removal and cleaning of one filter without interrupting the fluid flow through the fluid system. In this case, the first fluid port is secured to a fluid source while the second and third ports are fluidly connected to different filters.

One disadvantage of these previously known valve assemblies is that the interior components of the valve assembly are exposed to dirt and other debris in the influent and such debris can both score and accumulate on the sealing surfaces within the valve housing. Such scoring and/or accumulation oftentimes results in an inadequate seal between the valve member and the valve housing and results in leakage of fluid from the valve assembly.

SUMMARY OF THE PRESENT INVENTION

The present invention provides an improved valve assembly which overcomes the above-mentioned disadvantages of the previously known devices.

In brief, the valve assembly of the present invention comprises a housing having at least two and preferably three fluid ports. An elongated throughbore is formed through the housing and open at one end to the second port and, at its other end, to the third port. A cross bore formed in the housing is open to a midpoint of the throughbore at one end and, at its other end, forms the first port.

A piston having two piston parts is longitudinally slidably mounted in the housing throughbore and movable between a first and second position. Each piston part carries a seal member around its outer periphery so that, when the piston is in its first position, the seal on the first piston part sealingly engages a first seal surface in the housing throughbore thus fluidly disconnecting the third port from the first and second ports. Conversely, with the piston in its second position, the seal on the second piston part fluidly engages a second seal surface in the housing thus fluidly disconnecting the second port from the first and third ports. Consequently, as the piston is moved between its first and second positions, the first port is selectively fluidly connected with either the second or third port.

In order to prevent the accumulation of debris as well as minimize the effects of scoring of the seal surfaces, a scraping ring constructed of a hard material, such as steel, is attached to each piston part. Each scraping ring passes across and scrapes its respective seal surface as the piston moves between its first and second positions. In doing so, the scraping rings free any debris accumulated on the seal surfaces to insure maximum sealing including minimizing any possible scoring of the seal surfaces.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
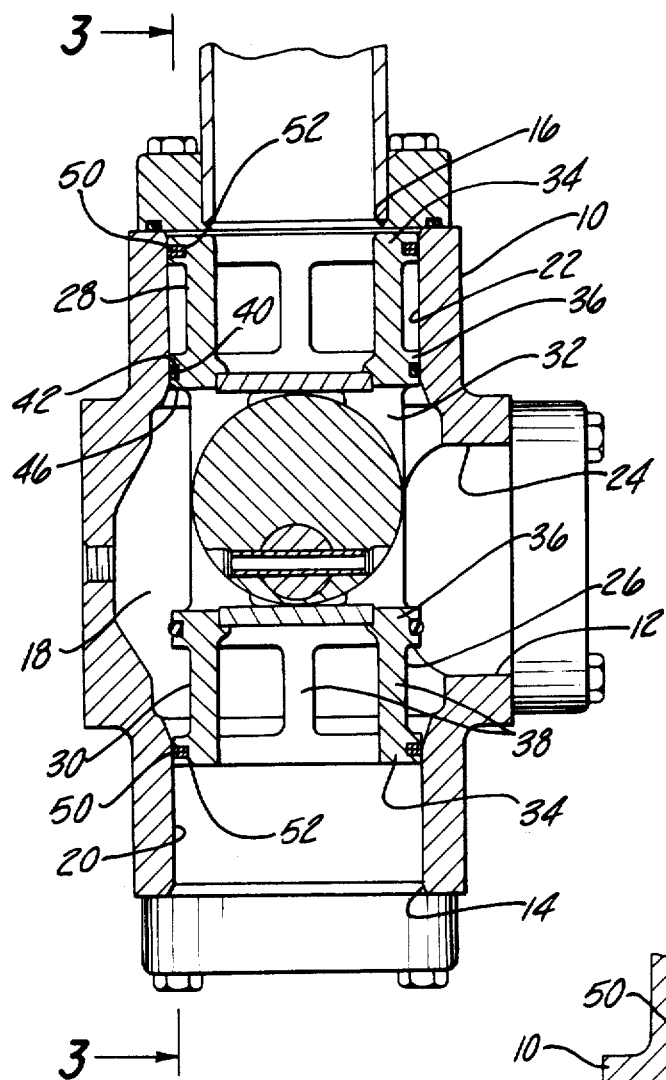
FIG. 1 is a longitudinal sectional view of a preferred embodiment of the present invention and illustrating a piston in its first position.
Figure 2:
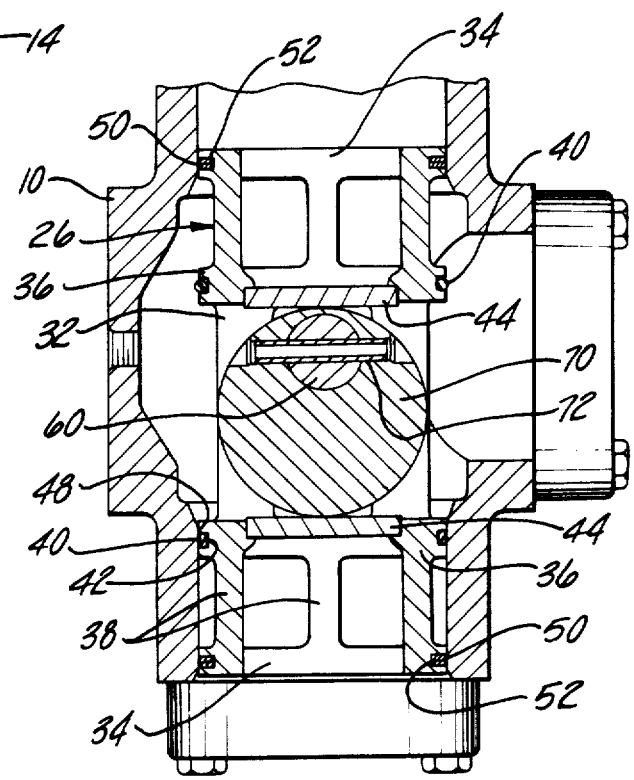
FIG. 2 is a fragmentary sectional view similar to FIG. 1 but illustrating the piston in its second position.

With reference first to FIGS. 1 and 2, a preferred embodiment of the valve assembly of the present invention is thereshown and comprises a housing 10 having a first fluid port 12, a second fluid port 14 and a third fluid port 16. All three fluid ports 12, 14 and 16 are adapted for connection to a fluid system.

Referring now particularly to FIG. 1, the second and third ports 14 and 16 are axially aligned with each other and fluidly connected together by an elongated throughbore 18. The throughbore 18 includes a first cylindrical surface 20 adjacent the second port 14 and a second cylindrical surface 22 adjacent the third port 16. A cross bore 24 is also formed in the housing 10 so that one end of the cross bore 24 intersects the throughbore 18 at a midpoint while its other end is open to the first port 12.

With reference again to FIGS. 1 and 2, a piston 26 is longitudinally slidably mounted within the housing throughbore 18 and movable between a first position, shown in FIG. 1, and a second position, shown in FIG. 2. The piston 26 includes a first piston part 28 and a substantially identical second piston part 30. The piston parts 28 and 30 are axially spaced from each other but secured together by spacing members 32 and the piston part 28 and 30 and spacing members 32 are preferably integrally constructed.

Still referring to FIGS. 1 and 2, each piston part 28 and 30 includes an outer annular ring 34 and an inner annular ring 36 which are secured together by axially extending and circumferentially spaced spacers 38. A seal 40, such as an O-ring is mounted within a groove 42 formed around the inner piston ring 36. In addition, a cover 44 (FIG. 2) is secured across and closes the inner axial end of the inner piston ring 36.

With reference now to FIG. 1, the piston 26 is shown in its first position in which the seal 40 on the first piston part 36 sealingly engages a sealing surface 46 on the cylindrical surface 22 of the housing throughbore 18. In doing so, the first piston part 28 fluidly disconnects the third port 16 from both the first port 12 and second port 14. Conversely, the first port 12 and second port 14 are fluidly connected together and thus allow fluid flow from the first port 12 and to the second port 14 or vice versa.

With reference now to FIG. 2, with the piston 26 in its second position, the seal 40 on the second piston part 30 sealingly engages a sealing surface 48 on the cylindrical surface 20 of the throughbore 18. In doing so, the second piston part 30 fluidly disconnects the second port 14 from the first and third ports 12 and 16, respectively. Simultaneously, the seal member 40 on the first piston part 28 disengages from its seal surface 46, shifts inwardly towards the center of the throughbore 18 and establishes fluid communication between the first port 12 and third port 16.

With reference again to FIGS. 1 and 2, a scraping ring 50 is secured within an annular groove 52 in the outer ring 34 of each piston part 28 and 30. The scraping ring 50 is constructed of a hard material, such as steel, and both engages and passes across or scrapes its respective sealing surface 46 or 48 as the piston 26 is moved between its first and second positions. In doing so, the scraping rings 50 free any debris accumulated on the sealing surfaces 46 and 48 and thereby minimize any scoring on the sealing surfaces 46 and 48 caused by debris in the influent.

Figure 3:
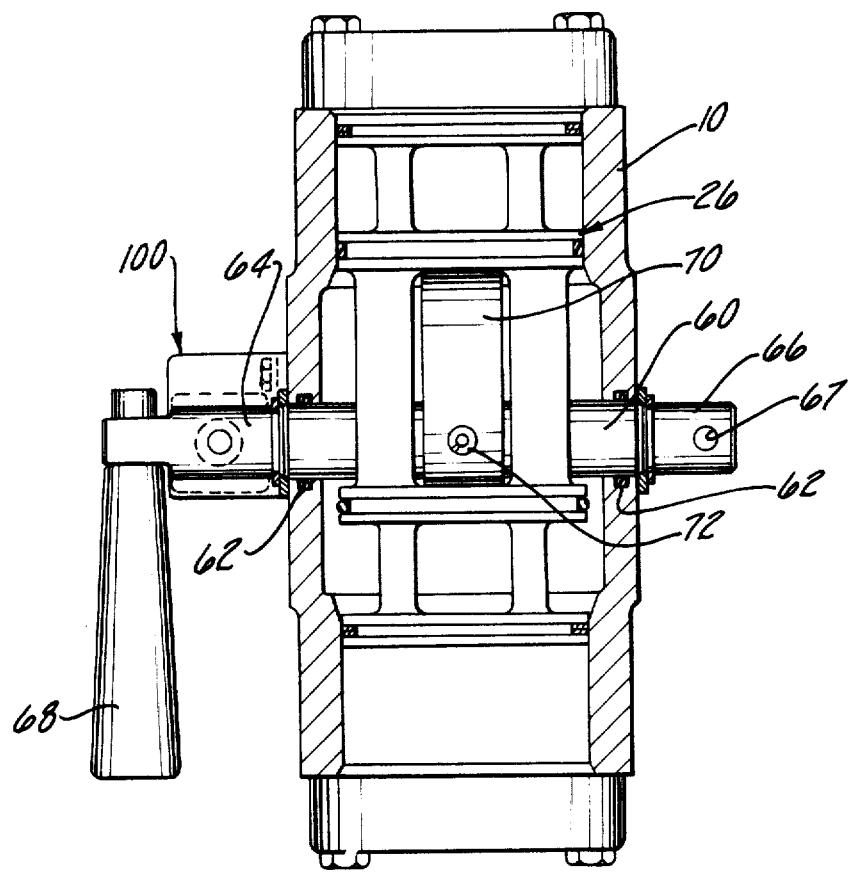
FIG. 3 is a longitudinal sectional view taken substantially along line 3—3 in FIG. 1.

With reference now to FIGS. 2 and 3, although any conventional means can be employed to move the piston 26 between its first and second positions, as illustrated in the drawing, a shaft 60 is rotatably mounted to the housing 10 so that the axis of the shaft is perpendicular to the axis of the throughbore 18 and preferably is also perpendicular to the axis of cross bore 24. Fluid seals 62 (FIG. 3) are provided between the housing 10 and the shaft 60 to minimize fluid leakage along the shaft 60. The shaft 60 is dimensioned so that one end 64 of the shaft 60 protrudes outwardly from one side of the housing 10 while the other end 66 of the shaft 60 protrudes outwardly from the other side of the housing 10. A handle 68 is secured by conventional means to the shaft end 64 to enable the shaft 60 to be manually rotated. The other shaft end 66 includes a cross bore 67 adapted to be secured to the shaft 60 of a second valve assembly so that rotation of the shaft 60 by the handle 68 simultaneously rotatably drives the shaft 60 in a second valve assembly.

With reference still to FIGS. 2 and 3, an eccentric cam 70 is positioned in between the piston parts 28 and 30 and secured to the shaft 60 by a roll pin 72. The cam 70 is dimensioned so that it simultaneously abuts against the covers 44 on both piston parts 28 and 30. Consequently, rotation of the cam 70 one hundred eighty degrees from the position shown in FIG. 1 simultaneously moves the piston from its first position, shown in FIG. 1, and to its second position, shown in FIG. 2, due to the eccentricity of the cam 70. A locking assembly 100 (FIG. 3) locks the shaft 60 against rotation when the piston 26 is in either its first or second positions.

In operation, the first port 12 of the valve assembly is typically fluidly connected to a source of unclear fluid while the second and third ports 14 and 16 are secured to two different filter assemblies (not shown). Thus, with the piston in its first position (FIG. 1) the influent to the valve assembly flows out through the second port 14 and to the filter assembly connected to the second port 14. At this time, the filter assembly connected to the third port 16 is unused.

When the filter connected to the second port 14 requires changing or cleaning, the handle 68 is used to shift the piston 26 to its second position (FIG. 2). In doing so, the scraping ring 50 on the second piston part 30 cleans the sealing surface 48 and, thereafter, the seal 40 on the second piston part 30 sealingly engages the seal surface 48. With the piston 26 in its second position, the second piston part 30 fluidly disconnects the second port 14 from the other two ports 12 and 16 and the piston 26 simultaneously establishes fluid communication from the first port 12, through the third port 16 and to the filter assembly connected to the third port 16. At this time, the filter assembly connected to the second port 14 can be removed, cleaned or changed as required. When the filter assembly connected to the third port 16 requires changing or cleaning, the above-described process is reversed.

One advantage of the present invention is the provision of the scraping rings 50 which clean the sealing surfaces 46 and 48 and thus insure maximum sealing including protection from scoring to minimize fluid leakage of the valve assembly.

In addition, the piston 26 with its seals 40 is dimensioned so that, at a midpoint of the piston 26 between its first and second position, all three ports 12, 14 and 16 are in fluid communication with each other. Thus, fluid flow through the valve assembly can continue uninterrupted as the piston 26 is shifted between its first and second positions.

Having described my invention, however, many modifications thereto will become apparent to those skilled in the art to which it pertains without deviation from the spirit of the invention as defined by the scope of the appended claims.

I claim:

1. A valve assembly comprising:
   a housing having a first port, a second port and a third port, said second and third ports being axially aligned, said ports adapted for fluid connection to a fluid system,
   a piston axially slidably mounted in said housing between a first position in which said first and second fluid ports are fluidly connected and a second position in which said first and third fluid ports are fluidly connected,
   a first and second seal, said first seal being carried by said piston at a position spaced inwardly from a first axial end of said piston, said second seal being carried by said piston at a position spaced inwardly from a second axial end of said piston, said first seal engaging a first sealing surface in said housing when said piston is in said first position and said second seal engaging a second sealing surface in said housing when said piston is in said second position,
   a first and second scraping member, said first scraping member being carried by said piston adjacent its first axial end and said second scraping member being carried by said piston adjacent its second axial end so that said seals are positioned in between said scraping members and so that said first and second scraping members pass across and respectively engage said first and second sealing surfaces as said piston moves between said first and second positions,
   wherein said piston is dimensioned so that portions of said piston adjacent both of said scraping members remain in contact with said housing as said piston moves between said first and second positions to thereby guide said piston within said housing, and means for moving said piston between said first and second positions.

2. The invention as defined in claim 1 wherein each said scraping member is constructed of a hard material.

3. The invention as defined in claim 1 wherein said housing comprises a throughbore forming said second port at one end and said third port at the other end, a cross bore formed in said housing which at one end intersects said housing throughbore at a midpoint and forms said first port at its other end, and wherein said piston is slidably mounted in said housing throughbore.

4. The invention as defined in claim 3 wherein at least a portion of said housing throughbore is cylindrical in cross section.

5. The invention as defined in claim 1 wherein said moving means comprises a shaft rotatably mounted to said housing, an eccentric cam secured to said shaft and positioned between and engagement with said piston parts, and a handle secured to one end of said shaft and accessible exteriorly of said housing for rotatably moving said cam between two predetermined rotational positions.

6. The invention as defined in claim 5 and comprising means for locking said cam at each of said predetermined positions.

7. The invention as defined in claim 5 wherein a second end of said shaft protrudes outwardly from said housing and includes means for attaching said shaft to a shaft of a further valve assembly.

8. The invention as defined in claim 1 wherein said seals are positioned on said piston parts so that said first, second and third ports are in fluid communication with each other at a position of said piston intermediate said first and second positions.

9. The invention as defined in claim 1 wherein said piston comprises an outer ring and an inner ring at each end and spacers which extend between and secure said inner rings together, and wherein said scraping members are secured to the outer rings and said seals are secured to the inner rings.

* * * * *